United States Patent [19]

Hackett

[11] Patent Number: 5,231,251
[45] Date of Patent: Jul. 27, 1993

[54] APPARATUS AND METHOD FOR THE ACQUISITION OF SEISMIC DATA

[75] Inventor: Gary K. Hackett, Yorba Linda, Calif.

[73] Assignee: Union Oil Company of California, Los Angeles, Calif.

[21] Appl. No.: 868,175

[22] Filed: Apr. 14, 1992

Related U.S. Application Data

[62] Division of Ser. No. 683,306, Apr. 10, 1991, Pat. No. 5,131,489.

[51] Int. Cl.⁵ .............................................. G01V 1/00
[52] U.S. Cl. ...................................... 181/112; 367/56; 367/177; 367/178; 367/37
[58] Field of Search ................. 181/108, 112; 367/178, 367/37, 154, 177, 56, 58

[56] References Cited

U.S. PATENT DOCUMENTS

| | | | |
|---|---|---|---|
| 4,280,201 | 7/1981 | Mart et al. | 367/56 |
| 4,285,052 | 8/1981 | Bobbitt | 367/56 |
| 4,484,314 | 11/1984 | Thigpen | 367/58 |
| 4,958,333 | 9/1990 | O'Brien | 367/154 |
| 5,089,995 | 2/1992 | Hackett | 367/76 |

OTHER PUBLICATIONS

*Encyclopedic Dictionary of Exploration Geophysics* by R. E. Sheriff, pub. by The Society of Exploration Geophysicists, 1973, p. 146.

*Primary Examiner*—J. Woodrow Eldred
*Attorney, Agent, or Firm*—Gregory F. Wirzbicki; Clark E. DeLarvin; William O. Jacobson

[57] ABSTRACT

The invention comprises a seismic recording apparatus and method. A multichannel recorder is connected to a cable formed from a plurality of signal conductors. Each of the signal conductors is connected to a different channel of the recorder via a multiplexer. The cable has a plurality of takeouts located at spaced distances along its length. Each of the takeouts is connected to a different signal conductor of the cable. A switch means is operably connected to one of the takeouts for selectively interconnecting the takeout and any one or more of several seismic detector connections upon receipt of a remotely generated signal. The invention also includes a number of detector conduits, each of which has one end operably connected to a different one of the seismic detector connections of the switch means. Each detector conduit has at least one geophone located along its length and operably connected thereto. A control means is provided for transmitting a signal to the switch means. The switch means sequentially interconnects a geophone or group of geophones with the recorder each time the multiplexer samples the takeout associated with that switch means.

19 Claims, 1 Drawing Sheet

APPARATUS AND METHOD FOR THE ACQUISITION OF SEISMIC DATA

This application is a division of application Ser. No. 07/683,306, filed Apr. 10, 1991, now U.S. Pat. No. 5,131,489.

FIELD OF THE INVENTION

The invention relates to an apparatus and method for the systematic seismic surveying or exploring of extended geographical areas. The invention particularly relates to an apparatus and method for obtaining seismic data for use in locating subsurface strata which might contain valuable minerals or hydrocarbons.

BACKGROUND OF THE INVENTION

In geophysical prospecting, seismic operations are frequently performed to generate and collect information indicative of the physical properties of subsurface formations. A conventional seismic land operation includes placing a seismic cable along the surface of the earth. Usually, the cable extends in a straight line and contains a plurality of wire pairs. A typical cable will contain from 48 to about 120 wire pairs. At regular intervals along the length of the cable, there are provided electrical connectors generally referred to as "takeouts." Each takeout is electrically connected to a separate pair of wires in the seismic cable. Typically, the takeouts are located at intervals of 50 to 200 feet along the length of the cable.

An array of geophones is attached to each takeout of the seismic cable. The array of geophones may consist of from one to fifty or more individual geophones. Each geophone is typically affixed to the surface of the earth by means of a spike so that, as the earth moves, the geophone moves as well. The geophones in any individual group are electrically interconnected so that the output signal from the group is a measure of the average motion sensed by all the geophones in that specific group.

In a typical seismic survey for a large geographical area, the area is covered by a plurality of survey lines. Seismic profiles are then recorded along these survey lines. On land, a seismic cable, typically approximately two miles in length and formed from a series of identical sections, is laid on the ground along a survey line. At each takeout, there is connected a two-wire conduit to electrically interconnect, for example, about 30 geophones into a single group or array. Each geophone group is located in the general vicinity of the takeout of the seismic cable to which it is attached.

A seismic signal is generated in the vicinity of the geophone groups. Typical seismic sources include explosive charges, weight drops, or other impact sources which impart a sudden impulse of energy to the surface of the earth in the survey area. Another type of seismic source is a vibrator which imparts a vibratory sweep of energy to the earth's surface for a period of time from a few seconds to about 20 seconds. Typically, the seismic signal is imparted into the earth at regularly spaced intervals along a portion of the length of the seismic cable.

One end of the seismic cable is connected to a seismic recorder, which typically includes a magnetic tape recorder. The seismic waves from each group of geophones usually are recorded on the magnetic tape in digital form. A multiple position switch, referred to as a roll-along switch, in a recording truck is advanced to a new position, thereby advancing the portion of the cable connected to the data recording equipment. After the desired data have been recorded, one or more of the cable sections are disconnected from one end of the two mile length of cable and reconnected to the other end. A new data recording cycle is then undertaken. After recordings have been taken along the full length of one survey line, the cable, geophones and recorder are moved to the next survey line and the process repeated until the entire geographical area has been covered.

The foregoing type of seismic data acquisition is generally referred to as the reflection method in which the seismic waves or impulses are generated at or near the earth's surface and these waves are reflected from subsurface acoustic impedance boundaries and detected by the array of seismic detectors located at the surface. Detector groups of considerable length are used preferentially in reflection seismic exploration in order to discriminate between signals and unwanted noise.

A disadvantage of having long lengths of detectors is the attenuation of high frequency signals. Attempts have been made to improve the high frequency response of seismic rays by using very short (a smaller number of detectors) arrays. The most common result is a considerable degradation of data quality owing to the decrease in signal-to-noise ratio.

It has been considered that it might be possible to restore the signal-to-noise ratio to a value comparable to that of arrays in common use by greatly increasing the number of arrays, in effect retaining the number of individual detectors in common use but subdividing them into many more but shorter arrays. A difficulty resulting from the use of shorter groups of sensors is that, for example, if a full-length, 2-mile seismic cable is to be employed and if the sensor density (number of sensors) is to remain unchanged, the number of signal channels which must be connected to the recorder is increased by an order of magnitude as the group length is reduced. This would mean about 10 times as many conductor wire pairs would have to be added to the cable if the group lengths were to be significantly reduced. Such an increase in the number of conductor wire pairs would greatly increase the weight and the bulk of the cable sections and decrease their flexibility to unacceptable levels.

SUMMARY OF THE INVENTION

This invention provides a seismic data acquisition apparatus and method capable of recording data from a wider area than was heretofore possible without the need for added wires or signal conductors in the cable. It also permits the use of shorter groups of sensors in a long array, also without the need for any added wire pairs in the cable. Thus, the present invention also can be utilized to maintain a high signal-to-noise ratio and at the same time enhance the high frequency response.

Broadly, the invention utilizes a multichannel recorder means and a length of cable comprising a plurality of signal conductors, each of the signal conductors being electrically connected to a different channel of the recorder. The cable is provided with a plurality of takeouts located at spaced distances along the length of the cable. Each of the takeouts is connected to a different signal conductor. A switch means is operably connected to one of the plurality of takeouts for selectively interconnecting the takeout and any one of a plurality of seismic detector connections upon receipt of a signal.

The invention further utilizes a number of detector conduits, each of which has an end operably connected to a different one of the seismic detector connections, and at least one seismic detector located along the length of each of the conduits and operably connected thereto. A control means is used to transmit a signal to a selected switch means for sequentially interconnecting the seismic detector conduits (associated with that switch) to the recorder each time a signal sample is taken at that takeout.

Advantageously, the switch means comprises an integrated circuit having a plurality of outlets, each of which outlets are addressable by an input binary code. Each outlet is connected to a solid state switch which is operated by an electrical impulse from the integrated circuit. The solid state switch interconnects an individual geophone or array of geophones with the takeout associated with the switch means.

BRIEF DESCRIPTION OF THE DRAWINGS

The use and advantages of the invention will be more apparent from a consideration of the following detailed description and the drawings in which.

DETAILED DESCRIPTION OF THE INVENTION

Figure 1:
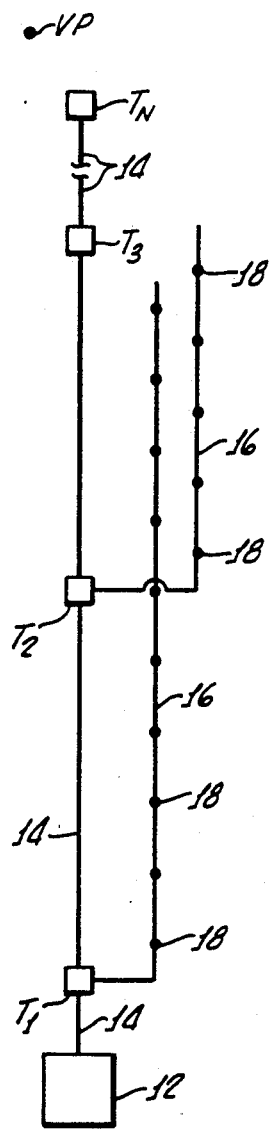
FIG. 1 is a diagram of a prior art seismic system.

It is believed that a review of a prior art seismic recording system will be beneficial to a better understanding of the present invention and the advantages obtained therefrom. Referring to FIG. 1, a typical prior art seismic system utilizing a reflection method comprises a recorder 12 and a seismic conduit 14 which extends along the surface of the earth, typically along a survey line. Cable 14 generally extends a distance of approximately two miles and is made up of individual cable sections, each section having a length of about 300 to 400 feet. It will be appreciated that in many instances the cable must be laid across terrain that is not accessible by vehicle. Thus, the cable preferably is in lengths having a weight which can be carried by one man.

Located along the length of cable 14 are a plurality of electrical connectors or takeouts T. The number of takeouts $T_n$ is equal to the number of wire pairs making up cable 14. Typically, the takeouts T are located at substantially uniform intervals of about 50 to 100 feet. At each takeout T, there is connected thereto one or more conduits 16. As depicted, at $T_1$, there is a conduit 16 (typically comprised of two wires) which extends substantially parallel to cable 14. At substantially regular intervals along the length of conduit 16 are a plurality of geophones 18 which are electrically connected to the two wires of conduit 16.

When a single linearly extending conduit is utilized, it typically will have a length of about 30 to 300 feet and be provided with 1 to about 50 geophones at spaced intervals along that length. Various other configurations are utilized for certain special applications and terrain conditions. The configuration shown at $T_1$ is one commonly used.

To initiate the collection of seismic data, a seismic source signal is transmitted into the earth, for example, at VP. The source signal travels across the surface of the earth and is sensed by geophones 18. In addition, the same signal radiates downwardly through the earth and is reflected back to the geophones from subsurface boundary layers. The former generally is considered undesirable noise and the latter is the source of the signal of interest. The seismic source may be stationary or it may be moved along a portion of the length of cable 14.

It will be appreciated that, while the array of geophones is shown as extending in only one direction, in many instances it will project linearly in both directions, and in some instances the number and arrangement of geophones at each takeout T may vary. The electrical signals generated by geophones 18 and transmitted to any given takeout represent a weighted average of the signals from all the geophones in that group. That average signal passes through an individual wire pair of cable 14 to recorder 12.

It also will be appreciated by those skilled in the art that the signals passing through each wire pair of cable 14 are not directly input to a separate channel of recorder 12. Generally the signals are introduced into a multiplexer which scans each of the wire pairs in sequence for a finite length of time. Typically, the multiplexer will process approximately 1,000 samples per second from cable 14. The individual samples can be recorded in analog form. However, they are not amenable to computer processing in such form. Thus, they preferably are passed through an analog to digital convertor prior to being recorded on their respective channel of the magnetic tape recorder. In addition, amplifiers also may be provided to increase the amplitude of signals from the respective takeouts.

Once a recording has been completed, a number of sections forming cable 14 are removed from one end and reconnected to the other end, along with their conduits 16 and geophones 18, and the recording cycle repeated until the linear length of the survey line has been recorded. Thereafter, the entire length of cable 14, conduits 16, geophones 18, and recorder 12 are moved to the next survey line and recording started again. Obviously, the movement of approximately two miles of heavy cable is a labor-intensive and expensive task. The use of a long array of geophones such as shown at $T_1$ provides a high signal-to-noise ratio but detracts from its ability to receive and transmit high frequency data.

Figure 2:
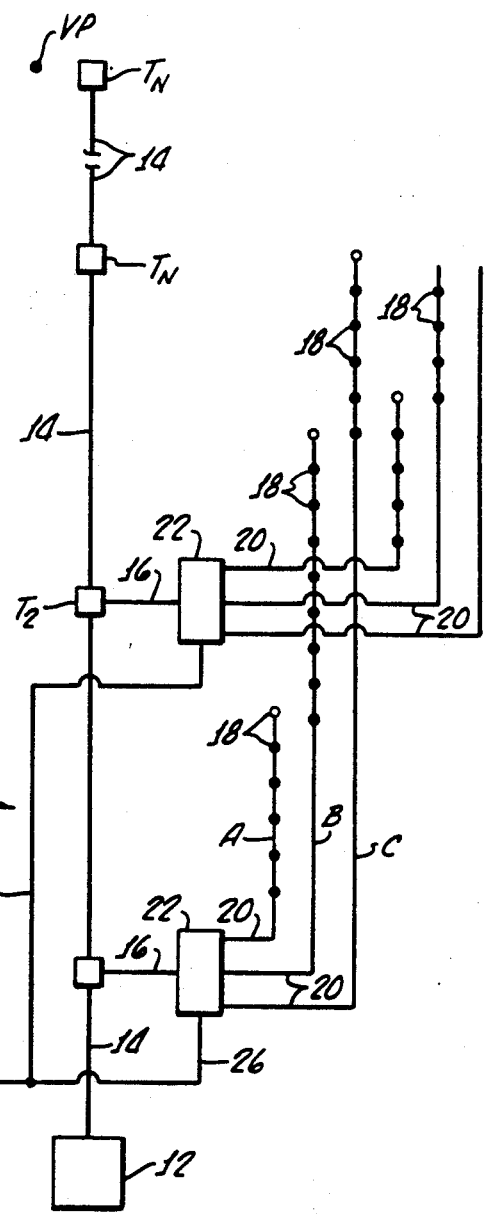
FIG. 2 is a diagram of a seismic system suitable for use with the present invention.

Referring now to FIG. 2, therein is shown a seismic system arranged in accordance with the present invention (like numbers in FIG. 1 referring to like parts in FIG. 2). The seismic system shown in FIG. 2, like that shown in FIG. 1, includes a recorder means 12 (including an associated multiplexer and an analog to digital converter), and a seismic cable 14 comprised of a plurality of signal conductors and provided with a number of takeouts $T_n$. The number of takeouts may be from as few as 100 to as many as 1000 or more with a fiber optic system. A typical number of takeouts for a wire pair system is about 100 to 200. A conduit 16 is attached to a signal conductor of each takeout. Typically, each conduit will have a length of about 200 to 300 feet, but in some applications they may be substantially longer. The present invention is applicable to systems using cables comprised of wire pairs or optical of comparison with the previously described system, the invention will be described with reference to a cable formed from a plurality of wire pairs.

For clarity, only three connections to takeouts T are shown. In contrast to the prior art, conduit 16 is connected to a switch means 22, rather than directly to geophones 18. The purpose of switch means 22 is to interconnect a takeout via conduit 16 with any one or more of a plurality of arrays of geophones via a conduit 20. In the interest of clarity, only three arrays of geophones are shown attached to each of the two switch means 22 at $T_1$ and $T_2$. However, in actual practice, it is anticipated that switch means 22 would have connections for attachment of from 2 to 4 or more arrays of geophones.

The number of geophone groups attached to the switch means may vary, depending upon the sample rate (frequency at which signal samples are taken from each takeout during a unit of time) required. More particularly, the multiplexer samples, for example, each takeout of a 120 takeout cable once every 2 milliseconds. In accordance with the present invention, the sampling rate for each group of geophones will be inversely proportional to the number of geophone groups attached to switch means 22. For example, if there were two groups of geophones, each group would be sampled every other two milliseconds. Thus, the number of geophone groups will be limited by the minimum acceptable sample rate required for reliable reproduction of the wave form of interest to be recorded. Switch means 22 provides for selectively and sequentially interconnecting a takeout to one array, to the exclusion of the others.

Switch means 22 could comprise conventional mechanical switches activated by solenoids or the like. However, in the interest of rapid switching speed and reducing the electrical power requirements of the switch, it is preferred that switch means 22 be formed from solid state circuitry. For example, switch means 22 could comprise an integrated circuit, which, upon receipt of an appropriate binary code, would transmit a signal through one of a plurality of outlets, each of said plurality of outlets being connected to a different solid state switching device. The selected solid state switching device would, in turn, interconnect an array of geophones with conduit 16 and its associated takeout. Thus, utilizing an appropriate combination of binary signals, it is possible to interconnect a selected array with the takeout associated with that switch.

The system also includes a controller 24 which is electrically interconnected via a cable 26 to each of switch means 22. The purpose of controller 24 is to send a signal through the wire pair associated with a specific switch mean 22 and thereby cause switch means 22 to interconnect a designated array of geophones with its associated conduit 16.

The control signal is timed to correspond with the multiplexer such that, at any given takeout, the switch is actuated at the same time the multiplexer is sampling that takeout. Each time the multiplexer samples a specific takeout, controller 24 sequentially switches to a different one of the groups of geophones until all of them have been sampled. Thereafter the cycle is repeated. Thus, the controller is synchronized with the multiplexer to concurrently interconnect a different geophone group with a takeout each time the multiplexer samples that takeout.

The practice of the present invention will be described by comparison with the operation of a prior art seismic system. It is believed such comparison will more clearly illustrate the practice and advantages of the present invention.

Referring to FIG. 1, for purposes of illustration, assume cable 14 has a length of 10,000 feet and is provided with 100 takeouts. Each takeout has a general configuration as shown at $T_1$, namely, the takeout is provided with an array comprising a linearly extending cable 16 having a length of 150 feet. Cable 16 is provided with 30 geophones 18 at evenly spaced intervals. The arrays of geophones overlap one another. The purpose of the overlap of arrays is to enhance the signal-to-noise ratio of the signals received.

Such a system would have a relatively high signal-to-noise ratio by virtue of the length of the arrays. However, the length would be such as to attenuate high frequency impulses which could be of value in assessing subterranean geological formations. Any changes in the number of geophones, length of the array, or arrangement of the array would necessitate manually connecting, disconnecting, or moving individual geophones. Clearly, this system provides little flexibility once it is installed and involves a substantial amount of physical labor moving it from one location to another.

Referring now to FIG. 2, utilizing a cable 14 having the same length and an equal number of takeouts, controller and switch means at each of the takeouts as hereinabove described, at each switch means there are several linearly extending arrays of geophones which may be arranged and utilized in several ways. For example, as depicted, it would be possible to utilize two or more arrays of various lengths. The arrays from each switch means could still overlap as in FIG. 1.

Conduit 20 of group A would have a length of 50 feet and contain an array of 10 geophones uniformly spaced along its entire length. Conduit 20 of group B would have a length of 100 feet and contain an array of 10 geophones spaced along its last 50 feet extending beyond Group A. Conduit 20 of group C would then have a length of 150 feet with an array of 10 geophones extending along the last 50 feet. Such an arrangement of short, staggered arrays will provide the benefit of a high signal-to-noise ratio while concurrently providing an enhanced sensitivity to higher frequencies than would be obtainable with the system shown in FIG. 1.

To obtain optimum recording results it may be preferred to use an array having a length greater than the wave length of the seismic wave having the lowest undesirable frequency. In addition, the distance between adjacent geophones should be less than the wave length of the seismic wave having the highest undesirable frequency (shortest wave length). Generally, this knowledge is not known a priori and may vary at different locations within the geographical area being surveyed. With the present invention, arrays of different length and different spacing between geophones may be used at each switch means, and the optimum array determined experimentally by firing a test shot.

Figure 3:
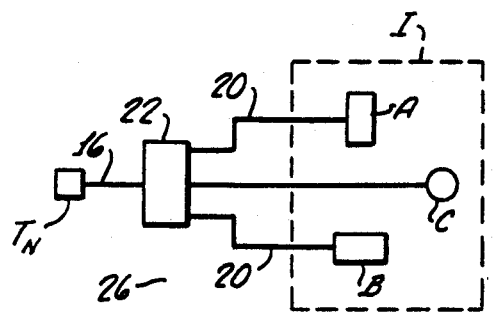
FIG. 3 is a diagram of a geophone array for which the present invention is uniquely adapted.

Another advantage of the present invention will be apparent with reference to FIG. 3, which schematically illustrates what frequently is referred to as a three component geophone and is indicated by Roman numeral I. This type of geophone is particularly suited for measuring shear waves, as well as conventional compression waves. As depicted, A, B and C represent geophone elements. A is oriented to measure waves moving along one axis, B is oriented to measure waves moving along an axis transverse to that of A, and C is oriented to measure waves moving along an axis transverse to both A and B. For example, A could be oriented to measure waves moving in a North-South direction, B to measure waves moving in an East-West direction, and C to measure waves moving in a vertical direction. Such an arrangement would normally require that, (1) three takeouts be used (one for each of the three geophone elements) or (2) three parallel cables be laid out side by side to provide three takeouts at each three component geophone.

In accordance with the present invention each geophone element A, B and C is connected to a switch means 22. Switch means 22 is, in turn, connected to a takeout $T_n$ via cable 16. Upon initiation of a seismic impulse, controller 24 will send signals to switch 22 to sequentially interconnect geophone elements A, then B and then C at substantially the same instant that signals are sampled at takeout $T_n$. Thus, the multiplexer would sample $T_n$ three times before all three geophones were sampled, since each sample from $T_n$ would only receive input data from A, B or C. Typically, each takeout is sampled at least once every 4 milliseconds and preferably at least once every 2 milliseconds.

It is emphasized that the foregoing description represents the preferred embodiments of the invention, and various alternative circuits or components may be utilized in the system disclosed herein without departing from the spirit of the invention. Thus, for example, different arrangements of arrays of geophones and other solid state devices may be employed. Similarly, other data processing equipment may be employed to utilize the data collected in accordance with the present invention. Accordingly, the scope of the invention is to be determined by the following claims and equivalences to which they are entitled.

What is claimed is:

1. A method of acquiring seismic data in a data collection system which includes a means for multiplexing data, said method comprising:
   (a) initiating a seismic impulse into the earth;
   (b) sensing earth movement at a plurality of locations located in the vicinity of said impulse;
   (c) alternately recording data from adjacent locations to the same channel of a multichannel recorder prior to multiplexing said channel; and
   (d) multiplexing said alternately recorded data on said same channel with another channel of said multichannel recorder.

2. The method of claim 1 wherein movement is sensed with geophones and data from two separate groups of geophones are sequentially and cyclically recorded on the same channel.

3. The method of claim 1 wherein geophones are used to sense said seismic impulse.

4. A method of acquiring seismic data in a data collection system which includes a means for multiplexing data, said method comprising:
   (a) initiating a seismic impulse into the earth;
   (b) utilizing geophones to detect movement of the earth in the vicinity of the impulse, said geophones being located at a plurality of separate locations, separately recording data from at least two adjacent locations on the same channel of a multichannel recorder prior to any multiplexing of said channel; and
   (c) multiplexing said separately recorded data on said same channel with data on another channel of said multichannel recorder.

5. The method of claim 4 wherein said data is stored on a magnetic tape in separate alternating segments.

6. The method of claim 5 wherein said geophones are serially connected in groups of from 1 to about 50.

7. The method of claim 6 wherein data from 2 to 4 groups of geophones are recorded on the same channel.

8. A method of acquiring seismic data comprising
   providing a multichannel recorder and a length of cable comprising a plurality of signal conductors,
   connecting an end of each of the signal conductors to a different channel of the recorder via a multiplexer means, the cable having a plurality of takeouts located at space distances along the length of the cable and each of the takeouts being connected to a different signal conductor;
   providing a switch means operably connected to at least one of said plurality of takeouts said switch means including a plurality of seismic detector connections, said switch means being capable of selectively interconnecting said takeout and any one of the seismic detector connections upon receipt of a signal;
   providing a plurality of detector conduits each of which has an end operably connected to a different one of said plurality of seismic detector connections and at least one seismic detector located along the length of each of the connector conduits and operably connected thereto;
   providing a control means for transmitting a signal to the switch means for electrically interconnecting one of the detector conduits with a takeout;
   initiating a seismic impulse into the earth;
   utilizing said multiplexer means for sequentially interconnecting individual channels of the recorder with their associated takeouts; and
   utilizing said control means for transmitting a signal to the switch means for electrically interconnecting one of said detector conduits with the takeout at substantially the same time that the multiplexer means interconnects that takeout with the multichannel recorder and sequentially interconnecting a different one of the detector conduits each time the multiplexer interconnects that channel and takeout.

9. The method of claim 8 wherein there are from 2 to 4 groups of seismic detectors connected to said switch means.

10. The method of claim 9 wherein each takeout is interconnected to a different channel of the recorder at time intervals of less than 4 milliseconds.

11. The method of claim 10 wherein said seismic detectors are geophones.

12. The method of claim 9 further providing a switch means for each of the takeouts.

13. The method of claim 9 wherein each takeout is connected to a different channel of the recorder at time intervals of less than 4 milliseconds.

14. The method of claim 11 wherein there are from 2 to 4 groups of geophones connected to said switch means.

15. The method of claim 14 wherein a switch means is provided for each takeout.

16. The method of claim 15 wherein each switch means is connected to from 2 to 4 groups of geophones.

17. The method of claim 16 wherein each takeout is connected to a different channel of the recorder at time intervals of less than 4 milliseconds.

18. The method of claim 17 wherein data from two groups of geophones are sequentially recorded on the same channel of the recorder.

19. The method of claim 18 wherein from 1–50 geophones are utilized in each group.

* * * * *